United States Patent
Shim et al.

(10) Patent No.: US 9,658,498 B2
(45) Date of Patent: May 23, 2017

(54) LIQUID CRYSTAL DISPLAY

(71) Applicant: Samsung Display Co., Ltd., Yongin, Gyeonggi-Do (KR)

(72) Inventors: Yi Seop Shim, Suwon-si (KR); Chang Hun Kwak, Suwon-si (KR); Hee Ra Kim, Seoul (KR); Chang-Soon Jang, Seoul (KR); Chul Huh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 196 days.

(21) Appl. No.: 14/485,043

(22) Filed: Sep. 12, 2014

(65) Prior Publication Data

US 2015/0077688 A1    Mar. 19, 2015

(30) Foreign Application Priority Data

Sep. 13, 2013  (KR) ........................ 10-2013-0110682

(51) Int. Cl.
*G02F 1/1339* (2006.01)
*G02F 1/1343* (2006.01)

(52) U.S. Cl.
CPC .... *G02F 1/134309* (2013.01); *G02F 1/13394* (2013.01); *G02F 1/134363* (2013.01); *G02F 2001/13396* (2013.01); *G02F 2001/134372* (2013.01)

(58) Field of Classification Search
None
See application file for complete search history.

(56) References Cited

U.S. PATENT DOCUMENTS

| | | | | |
|---|---|---|---|---|
| 2007/0291217 A1* | 12/2007 | Kang | ............... | G02F 1/136227 349/156 |
| 2009/0115947 A1* | 5/2009 | Huang | ............... | G02F 1/13394 349/106 |
| 2010/0110022 A1* | 5/2010 | Chen | ..................... | G06F 3/0414 345/173 |
| 2013/0222723 A1* | 8/2013 | Kim | ....................... | H01L 33/58 349/40 |
| 2013/0240916 A1* | 9/2013 | Choi | .................... | H01L 27/156 257/88 |

FOREIGN PATENT DOCUMENTS

| | | |
|---|---|---|
| JP | 11-305216 A | 11/1999 |
| JP | 2009-109725 A | 5/2009 |
| JP | 4774567 B2 | 7/2011 |
| JP | 4821310 B2 | 9/2011 |
| JP | 5167682 B2 | 1/2013 |
| KR | 10-2011-0016242 A | 2/2011 |
| KR | 10-1102251 B1 | 1/2012 |

* cited by examiner

*Primary Examiner* — Richard Kim
(74) *Attorney, Agent, or Firm* — Innovation Counsel LLP (57) ABSTRACT

A liquid crystal display is provided. The liquid crystal display includes a first substrate, and a first electrode and a second electrode formed overlapping with each other on the first substrate, wherein a first insulating layer is disposed between the first electrode and the second electrode. The liquid crystal display further includes a light blocking member formed on the second electrode, a first spacer and a second spacer formed on the light blocking member, and a second substrate facing the first substrate.

17 Claims, 7 Drawing Sheets

LIQUID CRYSTAL DISPLAY

CROSS-REFERENCE TO RELATED APPLICATION

This application claims priority to and the benefit of Korean Patent Application No. 10-2013-0110682 filed in the Korean Intellectual Property Office on Sep. 13, 2013, the entire contents of which are incorporated herein by reference.

BACKGROUND (a) Technical Field

The present disclosure relates to a liquid crystal display.

(b) Description of the Related Art

A liquid crystal display is commonly used in flat panel displays. To display an image, the liquid crystal display controls the amount of transmitted light by rearranging liquid crystal molecules in a liquid crystal layer. The liquid crystal molecules are rearranged by applying a voltage to an electrode in the liquid crystal display.

To increase transmittance and viewing angle, the liquid crystal display may include a pixel electrode and a common electrode formed on a common substrate.

The liquid crystal display may include two display panels. In some instances, the two display panels may be accidentally misaligned. Some solutions have been proposed to solve the misalignment problem. For example, one of the solutions includes forming a color filter and a light blocking member on a display panel on which the pixel electrode is formed. The light blocking member may include an organic material or an inorganic material.

However, if the light blocking member comes into contact with the liquid crystal layer or an alignment layer, the alignment layer and the liquid crystal layer may be contaminated by the organic material or the inorganic material in the light blocking member. The contamination of the liquid crystal layer may lead to a deterioration in a display quality and result in spots and afterimages.

SUMMARY

The present disclosure is directed to address at least the above problems relating to the contamination of the liquid crystal layer in a liquid crystal display.

According to some embodiments of the inventive concept, a liquid crystal display including a plurality of pixels is provided. The liquid crystal display includes a first substrate; a first electrode and a second electrode formed overlapping with each other on the first substrate, wherein a first insulating layer is disposed between the first electrode and the second electrode; a light blocking member formed on the second electrode; a first spacer and a second spacer formed on the light blocking member; and a second substrate facing the first substrate.

In some embodiments, the first spacer may contact a surface of the second substrate, and the second spacer may be spaced apart from the surface of the second substrate.

In some embodiments, the first spacer and the second spacer may include a transparent insulating material.

In some embodiments, a height of the first spacer may be about 2.0 µm to about 4.0 µm, and a height of the second spacer may be about 1.5 µm to about 3.5 µm.

In some embodiments, an area of the light blocking member may be about 5% to about 25% of an entire area of the plurality of pixels, an area of the first spacer may be about 0.05% to about 0.5% of the entire area of the plurality of pixels, and an area of the first spacer may be about 1.0% to about 25% of the entire area of the plurality of pixels.

In some embodiments, the first electrode may be planar-shaped and formed on a surface of the entire area of the plurality of pixels, the second electrode may include a plurality of branch electrodes, and the plurality of branch electrodes may overlap with the planar-shaped first electrode.

In some embodiments, the liquid crystal display may further include a cover layer formed between the light blocking member and the first and second spacers.

In some embodiments, the cover layer, the first spacer, and the second spacer may be formed of a same layer.

In some embodiments, the cover layer, the first spacer, and the second spacer may include a transparent insulating material.

In some embodiments, a height of the cover layer may be about 0.5 µm to about 2.5 µm, a height of the first spacer may be about 2.0 µm to about 4.0 µm, and a height of the second spacer may be about 1.5 µm to about 3.5 µm.

In some embodiments, an area of the light blocking member may be about 5% to about 25% of an entire area of the plurality of pixels, an area of the cover layer may be about 1.0% to about 25% of the entire area of the plurality of pixels, an area of the first spacer may be about 0.05% to about 0.5% of the entire area of the plurality of pixels, and an area of the second spacer may be about 1.0% to about 10% of the entire area of the plurality of pixels.

DETAILED DESCRIPTION OF THE EMBODIMENTS

The inventive concept will be described more fully herein with reference to the accompanying drawings, in which exemplary embodiments are shown. As those skilled in the art would realize, the embodiments may be modified in various ways without departing from the spirit or scope of the present disclosure.

In the drawings, the thickness of layers, films, panels, regions, etc., may have been exaggerated for clarity. Like reference numerals designate like elements throughout the specification. It will be understood that when an element such as a layer, film, region, or substrate is referred to as being "on" another element, it can be disposed directly on the other element or with one or more intervening elements being present. In contrast, when an element is referred to as being "directly on" another element, there are no intervening elements present.

Figure 1:
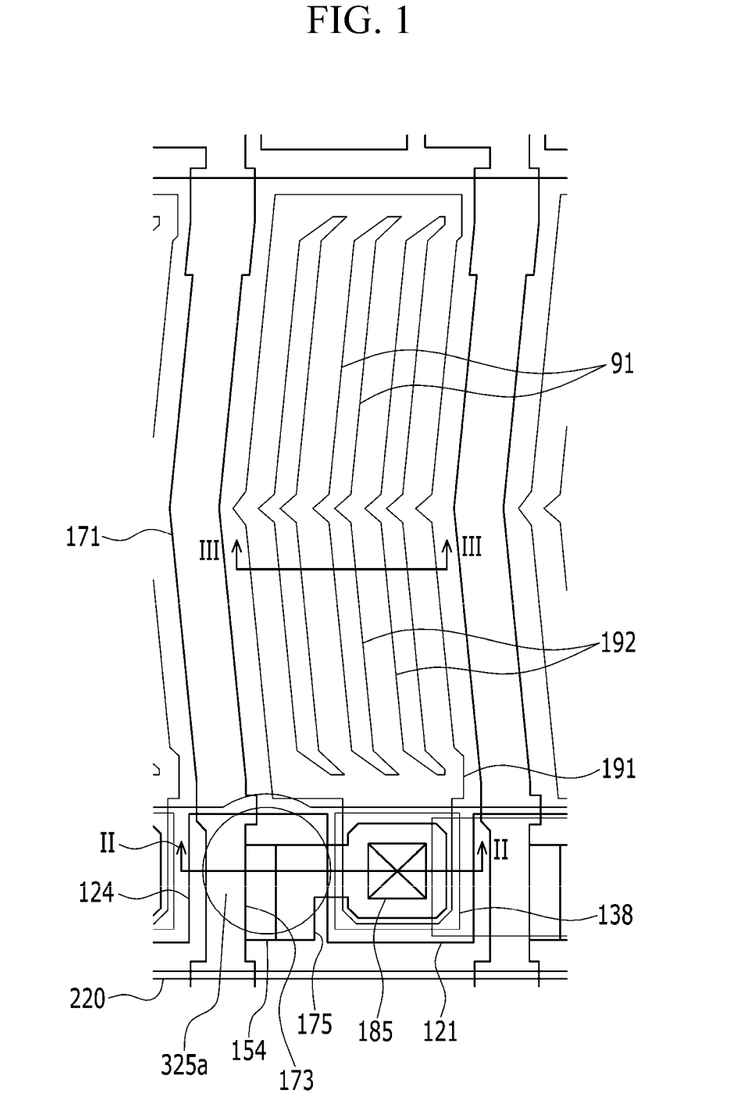
FIG. 1 is a layout view of a liquid crystal display according to an exemplary embodiment of the inventive concept.
Figure 2:
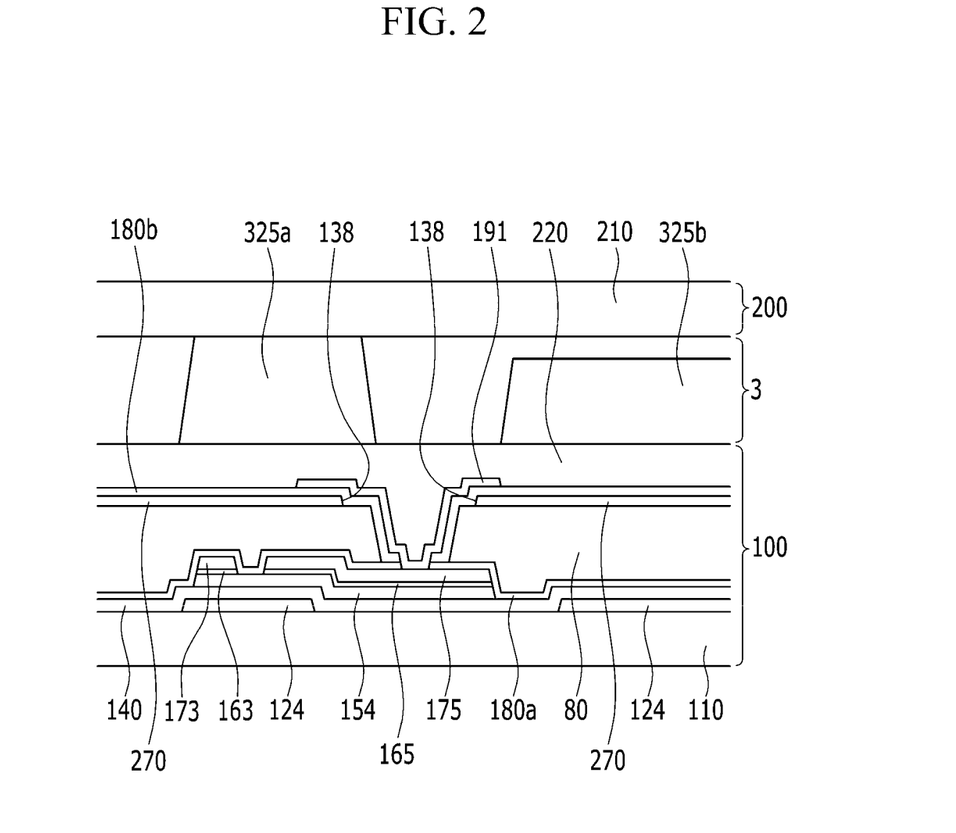
FIG. 2 is a cross-sectional view of the liquid crystal display of FIG. 1 taken along the line II-II.

First, a liquid crystal display according to an exemplary embodiment of the inventive concept will be described with reference to FIGS. 1 to 3. FIG. 1 is a layout view of a liquid crystal display according to an exemplary embodiment of the inventive concept; FIG. 2 is a cross-sectional view of the liquid crystal display of FIG. 1 taken along the line II-II; and FIG. 3 is a cross-sectional view of the liquid crystal display of FIG. 1 taken along the line III-III.

Figure 3:
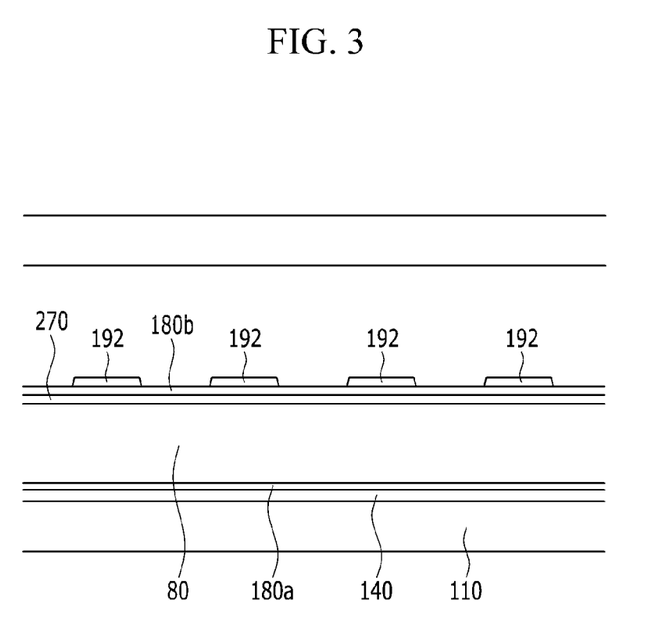
FIG. 3 is a cross-sectional view of the liquid crystal display of FIG. 1 taken along the line III-III.

Referring to FIGS. 1 to 3, the liquid crystal display includes a lower panel 100 and an upper panel 200 disposed facing each other and a liquid crystal layer 3 disposed therebetween.

The lower panel 100 will be described in more detail as follows.

A gate conductor including a gate line 121 is formed on a first substrate 110. The first substrate 110 may be formed of transparent glass, plastic, or other types of substrate materials.

The gate line 121 includes a wide end (not illustrated) for connection with a gate electrode 124, another layer, or an external driving circuit. The gate line 121 may be formed of aluminum-based metals (such as aluminum (Al) or aluminum alloys), silver-based metals (such as silver (Ag) or silver alloys), copper-based metals (such as copper (Cu) or copper alloys), molybdenum-based metals (such as molybdenum (Mo) or molybdenum alloys), chromium (Cr), tantalum (Ta), titanium (Ti), or other types of metals or metal alloys. In some embodiments, the gate line 121 may be formed as a multilayer structure including at least two conductive layers having different physical properties.

A gate insulating layer 140 is formed on the gate conductor 121. The gate insulating layer 140 may be formed of silicon nitride (SiNx), silicon oxide (SiOx), or other types of insulating materials. The gate insulating layer 140 may be formed as a multilayer structure including at least two insulating layers having different physical properties.

A semiconductor 154 is formed on the gate insulating layer 140. The semiconductor 154 may be formed of amorphous silicon, polysilicon, or other types of semiconductor materials. In some embodiments, the semiconductor 154 may include an oxide semiconductor.

Ohmic contacts 163 and 165 are formed on the semiconductor 154. The ohmic contacts 163 and 165 may be formed of n+ hydrogenated amorphous silicon doped with an n-type impurity (such as phosphorous at a high concentration). In some embodiments, the ohmic contacts 163 and 165 may be formed of silicide. The ohmic contacts 163 and 165 are formed as a pair and may be disposed on the semiconductor 154. In some particular embodiments, the ohmic contacts 163 and 165 may be omitted when the semiconductor 154 is an oxide semiconductor.

A data conductor is formed on the ohmic contacts 163 and 165 and the gate insulating layer 140. The data conductor includes a data line 171. The data line includes a source electrode 173 and a drain electrode 175.

The data line 171 includes a wide end (not illustrated) for connection with another layer or an external driving circuit. The data line 171 transfers a data signal, and extends substantially in a vertical direction intersecting the gate line 121.

In some embodiments, the data line 171 may include a first curved part formed having a curved shape to obtain a maximum transmittance of the liquid crystal display. The first curved part may be shaped as a letter V at an intermediate region of a pixel region. The data line 171 may also include a second curved part formed in the intermediate region of the pixel region. The second curved part may be curved such that the second curved part forms a predetermined angle to the first curved part.

The source electrode 173 constitutes a portion of the data line 171 and is disposed on a same line as the data line 171. The drain electrode 175 is formed extending parallel to the source electrode 173. Accordingly, the drain electrode 175 is formed parallel to a portion of the data line 171.

The gate electrode 124, the source electrode 173, and the drain electrode 175, together with the semiconductor 154, collectively form a thin film transistor (TFT). A channel of the thin film transistor is formed in the semiconductor 154 between the source electrode 173 and the drain electrode 175.

As previously mentioned, the source electrode 173 is disposed on the same line as the data line 171, and the drain electrode 175 extends parallel to the data line 171. Accordingly, a width of the thin film transistor may be increased without increasing the area occupied by the data conductors, thereby increasing an aperture ratio of the liquid crystal display.

The data line 171 and the drain electrode 175 may be formed of refractory metals (such as molybdenum, chromium, tantalum, or titanium) or an alloy thereof. The data line 171 and the drain electrode 175 may be formed as a multilayer structure including a refractory metal layer (not illustrated) and a low-resistance conductive layer (not illustrated). For example, the multilayer structure may include a double layer structure (comprising a chromium or molybdenum (alloy) lower layer and an aluminum (alloy) upper layer). In some embodiments, the multilayer structure may include a triple layer structure (comprising a molybdenum (alloy) lower layer, an aluminum (alloy) intermediate layer, and a molybdenum (alloy) upper layer).

A first passivation layer 180a is disposed on exposed portions of the data conductors 171, 173, and 175, the gate insulating layer 140, and the semiconductor 154.

The first passivation layer 180a may be formed of an organic insulating material, an inorganic insulating material, or other types of insulating materials.

A color filter 80 is formed on the first passivation layer 180a. The color filter 80 may be formed of an organic insulating material.

The color filter 80 may display one or more of the primary colors. Examples of the primary colors include the three primary colors (red, green, and blue), yellow, cyan, or magenta. Although not illustrated, the color filter may further include a color filter capable of displaying a mixed color that is formed by combining the primary colors or white, in addition to displaying the primary colors.

Although not illustrated, an overcoat (not illustrated) may be formed on the color filter 80. The overcoat may be formed of an inorganic insulating material or an organic insulating material.

A common electrode 270 is formed on the overcoat. The common electrode 270 may correspond to a first field generating electrode. The common electrode 270 may be formed on the surface of the first substrate 110 as an integrated plate having a planar shape. The common electrode 270 has an opening 138 which is disposed in a corresponding region around the drain electrode 175. Accordingly, the common electrode 270 may be formed as a planar-shaped plate.

The common electrodes 270 are disposed at adjacent pixels and are connected to each other so as to receive a common voltage. The common voltage may be supplied from outside of a display region.

A second passivation layer 180b is formed on the common electrode 270. The second passivation layer 180b may be formed of an organic insulating material, inorganic insulating material, or other types of insulating materials.

A pixel electrode 191 is formed on the second passivation layer 180b. The pixel electrode 191 includes a curved edge that is substantially parallel to the first curved part and the second curved part of the data line 171. The pixel electrode 191 includes a plurality of first cutouts 91. The pixel electrode 191 further includes a plurality of first branch electrodes 192 which are defined by the plurality of first cutouts 91.

A first contact hole 185 is disposed in the first passivation layer 180a and the second passivation layer 180b to expose the drain electrode 175. The pixel electrode 191 is physically and electrically connected to the drain electrode 175 through the first contact hole 185, so as to receive a voltage from the drain electrode 175.

A light blocking member 220 is formed on the pixel electrode 191 and the second passivation layer 180b. A first spacer 325a and a second spacer 325b are formed on the light blocking member 220.

The first spacer 325a and the second spacer 325b may be formed of a transparent insulating layer.

Although not illustrated, a first alignment layer is formed on the first spacer 325a and the second spacer 325b. The first alignment layer may include a horizontal alignment layer. The first alignment layer may be aligned in a predetermined direction. The first alignment layer may also include a photo alignment layer.

Next, the upper panel 200 will be described in more detail as follows.

Although not illustrated, a second alignment layer is formed on a second substrate 210. The second substrate 210 may be formed of transparent glass, plastic, or other types of substrate materials. The second alignment layer may include a horizontal alignment layer. The second alignment layer may be aligned in a predetermined direction. The second alignment layer may also include a photo alignment layer.

The liquid crystal layer 3 includes a liquid crystal material having positive dielectric anisotropy.

The liquid crystal molecules in the liquid crystal layer 3 may be arranged along a direction of a major axis that is parallel to the display panels 100 and 200.

The first spacer 325a and the second spacer 325b maintain a predetermined gap between the lower panel 100 and the upper panel 200. The first spacer 325a contacts a surface of the upper panel 200, and the second spacer 325b is spaced apart from the upper panel 200 by the predetermined gap.

In some embodiments, a height of the first spacer 325a may be about 2.0 μm to about 4.0 μm, and a height of the second spacer 325b may be about 1.5 μm to about 3.5 μm.

The pixel electrode 191 receives a data voltage from the drain electrode 175 and the common electrode 270 receives the common voltage from a common voltage applying unit. The common voltage applying unit is disposed outside the display region.

The pixel electrode 191 and the common electrode 270 serve as field generating electrodes to generate an electric field, such that the liquid crystal molecules in the liquid crystal layer 3 disposed between the two field generating electrodes 191 and 270 rotate in a direction parallel to a direction of the electric field. The polarization of light passing through the liquid crystal layer 3 changes according to the direction of rotation of the liquid crystal molecules.

Since the two field generating electrodes 191 and 270 are formed on a common display panel (display panel 100), the transmittance and viewing angle of the liquid crystal display can therefore be increased.

In some embodiments, the first spacer 325a and the second spacer 325b are formed on the light blocking member 220, so as to prevent the alignment layer or the liquid crystal layer 3 from being contaminated by the light blocking member 220. Accordingly, deterioration in display quality (such as spots or afterimages) can be mitigated.

In some embodiments, the common electrode 270 is planar-shaped and the pixel electrode 191 includes the plurality of first branch electrodes 192. In other embodiments, the pixel electrode 191 is planar-shaped and the common electrode 270 includes the plurality of first branch electrodes 192.

The inventive concept may be applied to other displays having two field generating electrodes overlapping with each other on a first substrate 110 with an insulating layer disposed therebetween, and where the first field generating electrode formed beneath the insulating layer is planar-shaped and the second field generating electrode formed on the insulating layer includes a plurality of branch electrodes.

Figure 4:
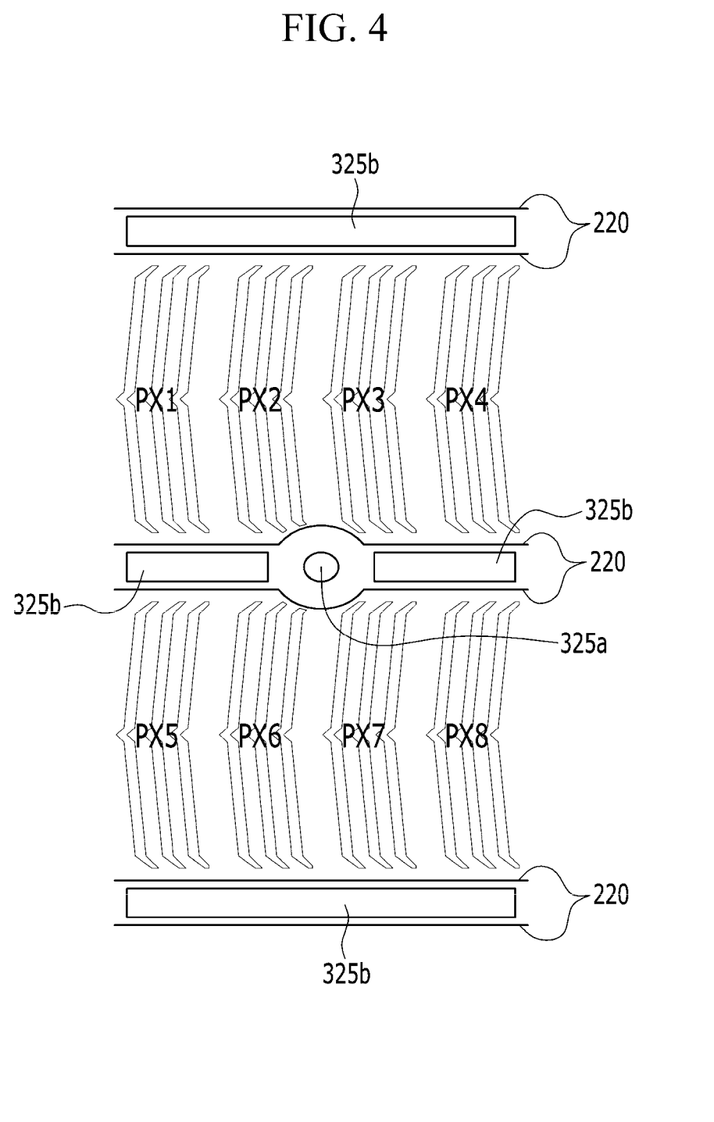
FIG. 4 is a layout view illustrating a plurality of pixel regions of a liquid crystal display according to an exemplary embodiment of the inventive concept.

Next, a plurality of pixel regions of an exemplary liquid crystal display will be described with reference to FIG. 4. FIG. 4 is a layout view illustrating a plurality of pixel regions of a liquid crystal display according to an exemplary embodiment of the inventive concept.

Referring to FIG. 4, the liquid crystal display includes a plurality of pixels PX1, PX2, PX3, PX4, PX5, PX6, PX7, and PX8 disposed in a matrix. The light blocking member 220 is disposed in the boundary portions between pixel rows of the plurality of pixels PX1, PX2, PX3, PX4, PX5, PX6, PX7, and PX8.

In some embodiments, an area of the light blocking member 220 may be about 5% to about 25% of the entire area of the plurality of pixels PX1, PX2, PX3, PX4, PX5, PX6, PX7, and PX8.

The first spacer 325a and the second spacer 325b are formed on the light blocking member 220. For example, the first spacer 325a and the second spacer 325b may be formed on at least a portion of the light blocking member 220.

In some embodiments, an area of the first spacer 325a may be about 0.05% to about 0.5% of the entire area of the plurality of pixels PX1, PX2, PX3, PX4, PX5, PX6, PX7, and PX8; and an area of the second spacer 325b may be about 1.0% to about 25% of the entire area of the plurality of pixels PX1, PX2, PX3, PX4, PX5, PX6, PX7, and PX8.

The first spacer 325a may overlap a portion of some pixels (e.g., PX2, PX3, PX6, and PX7). The second spacer 325b may overlap a portion of the plurality of pixels PX1, PX2, PX3, PX4, PX5, PX6, PX7, and PX8.

Figure 5:
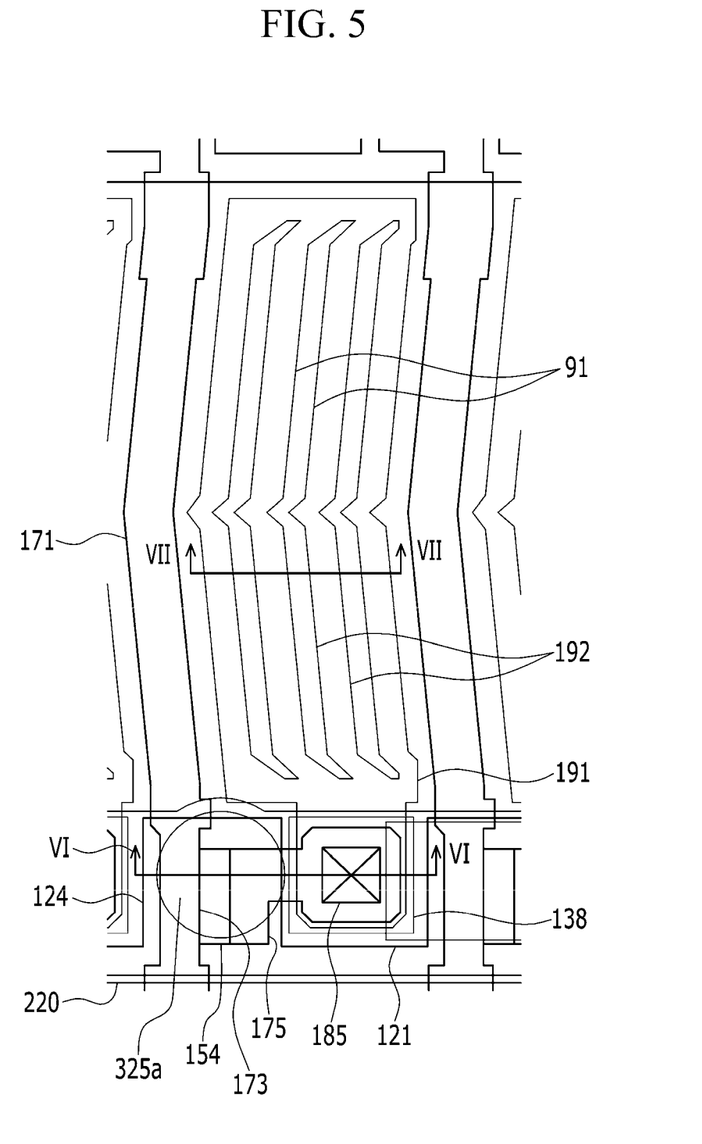
FIG. 5 is a layout view of a liquid crystal display according to another exemplary embodiment of the inventive concept.

Next, a liquid crystal display according to another exemplary embodiment of the inventive concept will be described in detail with reference to FIGS. 5 and 6. FIG. 5 is a layout view of a liquid crystal display according to another exemplary embodiment of the inventive concept; and FIG. 6 is a cross-sectional view of the liquid crystal display of FIG. 5 taken along the line VI-VI.

Figure 6:
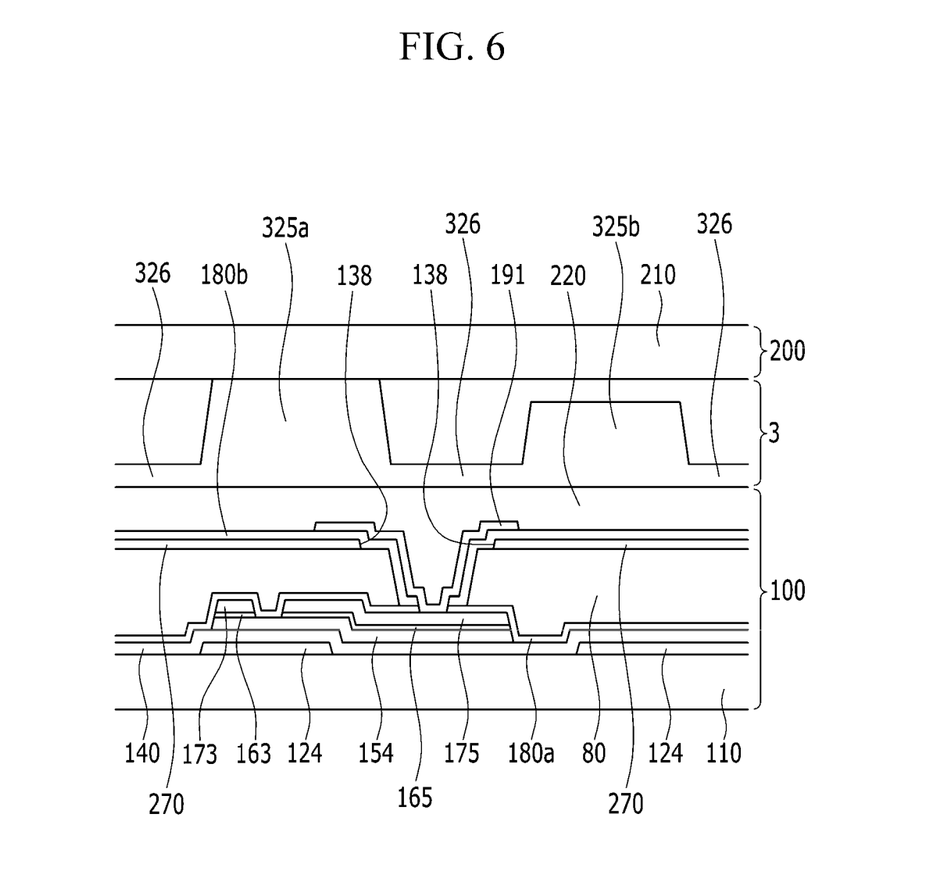
FIG. 6 is a cross-sectional view of the liquid crystal display of FIG. 5 taken along the line VI-VI.

The liquid crystal display in FIGS. 5 and 6 is substantially similar to the liquid crystal display in FIGS. 1 to 3. Therefore a detailed description of the same constituent elements shall be omitted.

Referring to FIGS. 5 and 6, the liquid crystal display includes a lower panel 100 and an upper panel 200 disposed facing each other and a liquid crystal layer 3 disposed therebetween.

The lower panel 100 in FIG. 6 will be described in more detail as follows.

A gate conductor including a gate line 121 is formed on a first substrate 110. The first substrate 110 may be formed of transparent glass, plastic, or other types of substrate materials.

The gate line 121 includes a wide end (not illustrated) for connection with a gate electrode 124, another layer, or an external driving circuit.

A gate insulating layer 140 is formed on the gate conductor 121. The gate insulating layer 140 may be formed of silicon nitride (SiNx), silicon oxide (SiOx), or other types of insulating materials.

A semiconductor 154 is formed on the gate insulating layer 140. The semiconductor 154 may be formed of amorphous silicon, polysilicon, or other types of semiconductor materials. The semiconductor 154 may include an oxide semiconductor.

Ohmic contacts 163 and 165 are formed on the semiconductor 154. The ohmic contacts 163 and 165 are formed as a pair and may be disposed on the semiconductor 154. In some particular embodiments, the ohmic contacts 163 and 165 may be omitted when the semiconductor 154 includes an oxide semiconductor.

A data conductor is formed on the ohmic contacts 163 and 165 and the gate insulating layer 140. The data conductor includes a data line 171. The data line 171 includes a source electrode 173 and a drain electrode 175.

The data line 171 includes a wide end (not illustrated) for connection with another layer or an external driving circuit. The data line 171 transfers a data signal, and extends substantially in a vertical direction intersecting the gate line 121.

In some embodiments, the data line 171 may include a first curved part formed having a curved shape to obtain a maximum transmittance of the liquid crystal display. The first curved part may be shaped as a letter V at an intermediate region of a pixel region. The data line 171 may also include a second curved part formed in the intermediate region of the pixel region. The second curved part may be curved such that the second curved part forms a predetermined angle to the first curved part.

The source electrode 173 constitutes a portion of the data line 171 and is disposed on a same line as the data line 171. The drain electrode 175 is formed extending parallel to the source electrode 173. Accordingly, the drain electrode 175 is parallel to a portion of the data line 171.

The gate electrode 124, the source electrode 173, and the drain electrode 175, together with the semiconductor 154, collectively form a thin film transistor (TFT). A channel of the thin film transistor is formed in the semiconductor 154 between the source electrode 173 and the drain electrode 175.

A first passivation layer 180a is disposed on exposed portions of the data conductors 171, 173, and 175, the gate insulating layer 140, and the semiconductor 154. The first passivation layer 180a may be formed of an organic insulating material, an inorganic insulating material, or other types of insulating materials.

A color filter 80 is formed on the first passivation layer 180a. The color filter 80 may be formed of an organic insulating material.

Although not illustrated, an insulating layer (not illustrated) may be formed on the color filter 80. The insulating layer may include an inorganic insulating material or an organic insulating material. The insulating layer prevents components of the color filter 80 (such as pigments) from flowing to adjacent layers.

A common electrode 270 is formed on the insulating layer. The common electrode 270 may correspond to a first field generating electrode. The common electrode 270 may be formed on the surface of the first substrate 110 as an integrated plate having a planar shape. The common electrode 270 has an opening 138 which is disposed in a corresponding region around the drain electrode 175. Accordingly, the common electrode 270 may be formed as a planar-shaped plate.

The common electrodes 270 are disposed at adjacent pixels and are connected to each other so as to receive a common voltage. The common voltage may be supplied from outside of a display region.

A second passivation layer 180b is formed on the common electrode 270. The second passivation layer 180b may be formed of an organic insulating material, an inorganic insulating material, or other types of insulating materials.

A pixel electrode 191 is formed on the second passivation layer 180b. The pixel electrode 191 includes a curved edge that is substantially parallel to the first curved part and the second curved part of the data line 171. The pixel electrode 191 includes a plurality of first cutouts 91. The pixel electrode 191 further includes a plurality of first branch electrodes 192 which are defined by the plurality of first cutouts 91.

A first contact hole 185 is disposed in the passivation layer 180a and the second passivation layer 180b to expose the drain electrode 175. The pixel electrode 191 is physically and electrically connected to the drain electrode 175 through the first contact hole 185, so as to receive a voltage from the drain electrode 175.

A light blocking member 220 is formed on the pixel electrode 191 and the second passivation layer 180b. A cover layer 326, a first spacer 325a, and a second spacer 325b are formed on the light blocking member 220. The cover layer 326, the first spacer 325a, and the second spacer 325b may be formed of a same layer. The cover layer 326 is formed on the light blocking member 220, and the first spacer 325a and the second spacer 325b are formed on the cover layer 326. The cover layer 326 may cover at least a portion of the light blocking member 220.

The cover layer 326, the first spacer 325a, and the second spacer 325b may be formed of a transparent insulating layer.

Although not illustrated, a first alignment layer is formed on the cover layer 325, the first spacer 325a, and the second spacer 325b. The first alignment layer may include a horizontal alignment layer. The first alignment layer may be aligned in a predetermined direction. The first alignment layer may also include a photo alignment layer.

Next, the upper panel 200 in FIG. 6 will be described in more detail as follows.

Although not illustrated, a second alignment layer is formed on a second substrate 210. The second substrate 210 may be formed of transparent glass, plastic, or other types of substrate materials. The second alignment layer may include a horizontal alignment layer. The second alignment layer may be aligned in a predetermined direction. The second alignment layer may also include a photo alignment layer.

The liquid crystal layer 3 includes a liquid crystal material having positive dielectric anisotropy.

The liquid crystal molecules in the liquid crystal layer 3 may be arranged along a direction of a major axis that is parallel to the display panels 100 and 200.

The first spacer 325a and the second spacer 325b maintain a predetermined gap between the lower panel 100 and the upper panel 200. The first spacer 325a contacts a surface of the upper panel 200, and the second spacer 325b is spaced apart from the upper panel 200 by the predetermined gap.

The cover layer 326 is formed on the light blocking member 220, and the first spacer 325a and the second spacer 325b are formed on a portion of the cover layer 326. In some embodiments, a height of the cover layer 326 may be lower than respective heights of the first spacer 325a and the second spacer 325b. For example, a height of the cover layer 326 may be about 0.5 μm to about 2.5 μm; a height of the first spacer 325a may be about 2.0 μm to about 4.0 μm; and a height of the second spacer 325b may be about 1.5 μm to about 3.5 μm.

The pixel electrode 191 receives a data voltage from the drain electrode 175 and the common electrode 270 receives the common voltage from a common voltage applying unit. The common voltage applying unit is disposed outside the display region.

The pixel electrode 191 and the common electrode 270 serve as field generating electrodes to generate an electric field, such that the liquid crystal molecules in the liquid crystal layer 3 disposed between the two field generating electrodes 191 and 270 rotate in a direction parallel to a direction of the electric field. The polarization of light passing through the liquid crystal layer changes according to the direction of rotation of the liquid crystal molecules.

Since the two field generating electrodes 191 and 270 are formed on a common display panel (display panel 100), the transmittance and viewing angle of the liquid crystal display can therefore be increased.

In some embodiments, the cover layer 326, the first spacer 325a, and the second spacer 325b are formed on the light blocking member 220, so as to prevent the alignment layer or the liquid crystal layer 3 from being contaminated by the light blocking member 220. Accordingly, deterioration in display quality (such as spots or afterimages) can be mitigated.

In some embodiments, the common electrode 270 is planar-shaped and the pixel electrode 191 includes a plurality of first branch electrodes 192. In other embodiments, the pixel electrode 191 is planar-shaped and the common electrode 270 includes a plurality of first branch electrodes 192.

The inventive concept may be applied to other displays having two field generating electrodes overlapping with each other on a first substrate 110 with an insulating layer disposed therebetween, and where the first field generating electrode formed beneath the insulating layer is planar-shaped and the second field generating electrode formed on the insulating layer includes a plurality of branch electrodes.

Figure 7:
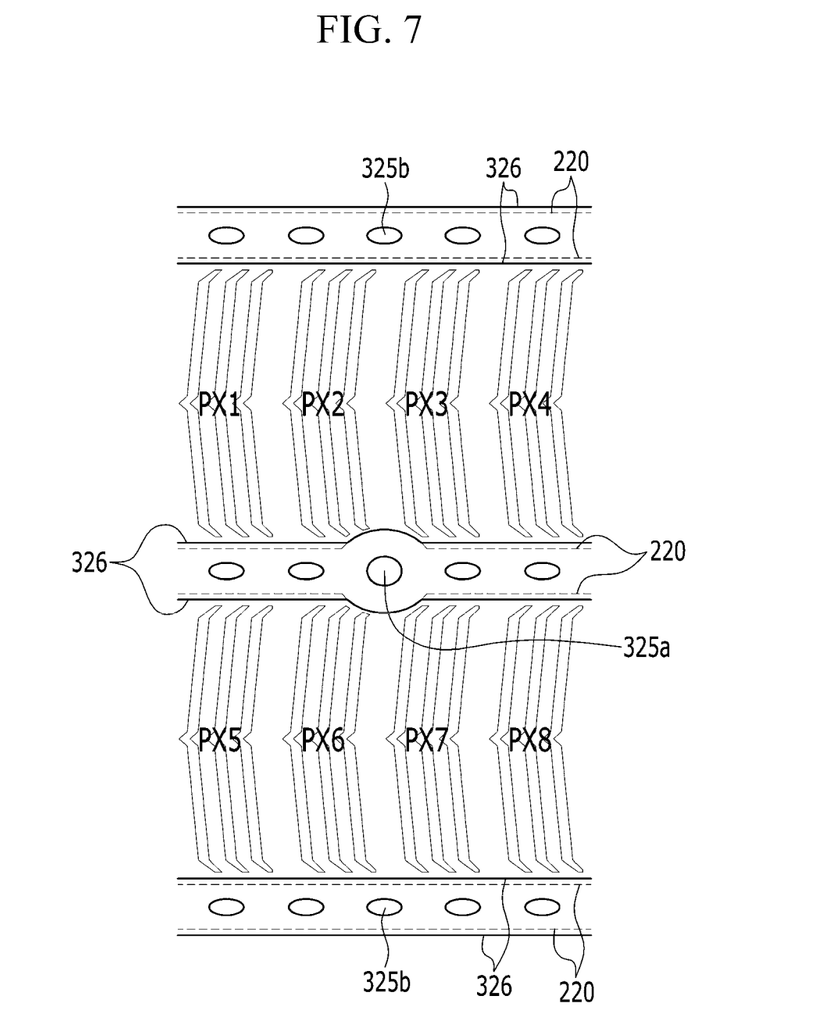
FIG. 7 is a layout view illustrating a plurality of pixel regions of a liquid crystal display according to another exemplary embodiment of the inventive concept.

Next, a plurality of pixel regions of an exemplary liquid crystal display will be described with reference to FIG. 7. FIG. 7 is a layout view illustrating a plurality of pixel regions of a liquid crystal display according to another exemplary embodiment of the inventive concept.

Referring to FIG. 7, the liquid crystal display includes a plurality of pixels PX1, PX2, PX3, PX4, PX5, PX6, PX7, and PX8 disposed in a matrix. The light blocking member 220 is disposed in the boundary portions between pixel rows of the plurality of pixels PX1, PX2, PX3, PX4, PX5, PX6, PX7, and PX8.

In some embodiments, an area of the light blocking member 220 may be about 5% to about 25% of the entire area of the plurality of pixels PX1, PX2, PX3, PX4, PX5, PX6, PX7, and PX8.

The cover layer 326, the first spacer 325a, and the second spacer 325b are formed on the light blocking member 220.

In some embodiments, an area of the cover layer 326 may be about 1.0% to about 25% of the entire area of the plurality of pixels PX1, PX2, PX3, PX4, PX5, PX6, PX7, and PX8; an area of the first spacer 325a may be about 0.05% to about 0.5% of the entire area of the plurality of pixels PX1, PX2, PX3, PX4, PX5, PX6, PX7, and PX8; and an area of the second spacer 325b may be about 1.0% to about 10% of the entire are of the plurality of pixels PX1, PX2, PX3, PX4, PX5, PX6, PX7, and PX8.

The first spacer 325a may overlap a portion of some pixels (e.g., PX2, PX3, PX6, and PX7). The second spacer 325b may overlap a portion of the plurality of pixels PX1, PX2, PX3, PX4, PX5, PX6, PX7, and PX8.

While the inventive concept has been described in connection with what is presently considered to be exemplary embodiments, it is to be understood that the inventive concept is not limited to the described embodiments, but, on the contrary, is intended to cover various modifications and equivalent arrangements included within the spirit and scope of the present disclosure.

What is claimed is:

1. A liquid crystal display including a plurality of pixels, comprising:
   a first substrate;
   a first electrode and a second electrode formed overlapping with each other on the first substrate, wherein a first insulating layer is disposed between the first electrode and the second electrode;
   a light blocking member formed on the second electrode;
   a first spacer formed directly on the light blocking member;
   a second spacer formed directly on the light blocking member and along the light blocking member; and
   a second substrate facing the first substrate,
   wherein the first spacer and the second spacer include a transparent insulating material.

2. The liquid crystal display of claim 1, wherein:
   the first spacer contacts a surface of the second substrate, and the second spacer is spaced apart from the surface of the second substrate.

3. The liquid crystal display of claim 2, wherein:
   a height of the first spacer is about 2.0 μm to about 4.0 μm, and a height of the second spacer is about 1.5 μm to about 3.5 μm.

4. The liquid crystal display of claim 3,
   wherein an area of the light blocking member is about 5% to about 25% of an entire area of the plurality of pixels,
   an area of the first spacer is about 0.05% to about 0.5% of the entire area of the plurality of pixels, and
   an area of the second spacer is about 1.0% to about 25% of the entire area of the plurality of pixels.

5. The liquid crystal display of claim 4, wherein:
   the first electrode is planar-shaped and formed on a surface of the entire area of the plurality of pixels,
   the second electrode includes a plurality of branch electrodes, and
   the plurality of branch electrodes overlap with the planar-shaped first electrode.

6. The liquid crystal display of claim 1, further comprising:
   a cover layer formed between the light blocking member and the first and second spacers.

7. The liquid crystal display of claim 6, wherein:
   the cover layer, the first spacer, and the second spacer are formed of a same layer.

8. The liquid crystal display of claim 7, wherein:
a height of the cover layer is about 0.5 μm to about 2.5 μm,
a height of the first spacer is about 2.0 μm to about 4.0 μm, and
a height of the second spacer is about 1.5 μm to about 3.5 μm.

9. The liquid crystal display of claim 8,
wherein an area of the light blocking member is about 5% to about 25% of an entire area of the plurality of pixels,
an area of the cover layer is about 1.0% to about 25% of the entire area of the plurality of pixels,
an area of the first spacer is about 0.05% to about 0.5% of the entire area of the plurality of pixels, and
an area of the second spacer is about 1.0% to about 10% of the entire area of the plurality of pixels.

10. The liquid crystal display of claim 9, wherein:
the first electrode is planar-shaped and formed on a surface of the entire area of the plurality of pixels,
the second electrode includes a plurality of branch electrodes, and
the plurality of branch electrodes overlap with the planar-shaped first electrode.

11. The liquid crystal display of claim 6, wherein:
the cover layer includes the transparent insulating material.

12. The liquid crystal display of claim 6, wherein:
a height of the cover layer is about 0.5 μm to about 2.5 μm,
a height of the first spacer is about 2.0 μm to about 4.0 μm, and
a height of the second spacer is about 1.5 μm to about 3.5 μm.

13. The liquid crystal display of claim 6,
wherein an area of the light blocking member is about 5% to about 25% of an entire area of the plurality of pixels,
an area of the cover layer is about 1.0% to about 25% of the entire area of the plurality of pixels,
an area of the first spacer is about 0.05% to about 0.5% of the entire area of the plurality of pixels, and
an area of the second spacer is about 1.0% to about 10% of the entire area of the plurality of pixels.

14. The liquid crystal display of claim 6, wherein:
the first electrode is planar-shaped and formed on a surface of the entire area of the plurality of pixels,
the second electrode includes a plurality of branch electrodes, and
the plurality of branch electrodes overlap with the planar-shaped first electrode.

15. The liquid crystal display of claim 1, wherein:
a height of the first spacer is about 2.0 μm to about 4.0 μm, and a height of the second spacer is about 1.5 μm to about 3.5 μm.

16. The liquid crystal display of claim 1,
wherein an area of the light blocking member is about 5% to about 25% of an entire area of the plurality of pixels,
an area of the first spacer is about 0.05% to about 0.5% of the entire area of the plurality of pixels, and
an area of the second spacer is about 1.0% to about 25% of the entire area of the plurality of pixels.

17. The liquid crystal display of claim 1, wherein:
the first electrode is planar-shaped and formed on a surface of the entire area of the plurality of pixels,
the second electrode includes a plurality of branch electrodes, and
the plurality of branch electrodes overlap with the planar-shaped first electrode.

* * * * *